United States Patent [19]

Berggren et al.

[11] 3,992,243

[45] Nov. 16, 1976

[54] APPARATUS FOR PRODUCING TRANSPARENCY SLIDE UNITS

[75] Inventors: Rolf Uno Berggren, Gotene; Erik Gustav Birger Blom, Mariestad, both of Sweden

[73] Assignee: Sven Goran Pettersson, Oberageri, Switzerland

[22] Filed: Nov. 26, 1974

[21] Appl. No.: 527,384

Related U.S. Application Data

[62] Division of Ser. No. 387,550, Aug. 13, 1973, Pat. No. 3,878,632.

[30] Foreign Application Priority Data

Aug. 17, 1972 Sweden ............................ 7310704

[52] U.S. Cl. ............................ 156/521; 156/108; 156/566; 156/580

[51] Int. Cl.$^{2}$ .................... B29C 27/02; B32B 31/16

[58] Field of Search .......... 156/521, 108, 391, 517, 156/580, 583, 152, 566; 40/158 B

[56] References Cited

UNITED STATES PATENTS

| | | | |
|---|---|---|---|
| 2,889,066 | 6/1959 | Alberty | 156/521 |
| 3,562,074 | 2/1971 | Mundt et al. | 156/580 |
| 3,816,219 | 6/1974 | Hurlbut et al. | 156/521 X |

*Primary Examiner*—William A. Powell
*Assistant Examiner*—M. G. Wityshyn
*Attorney, Agent, or Firm*—Fred Philpitt

[57] ABSTRACT

A transparency slide unit for use in projectors and viewers comprising a film diapositive mounted and positively retained in a frame composed of two separate and substantially uniform frame halves permanently interlocked in mutually offset positions by riveting, and an apparatus for mounting film transparencies in such frames.

6 Claims, 12 Drawing Figures

APPARATUS FOR PRODUCING TRANSPARENCY SLIDE UNITS

Figure 1:
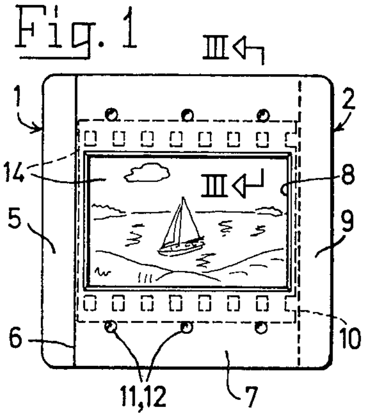

This is a division of application Ser. No. 387,550, filed Aug. 13, 1973, and now U.S. Pat. No. 3,878,632.

The invention relates to transparency slide units for use with projectors and viewers as well as a method and an apparatus for producing the same.

A transparency slide unit, in the sense of the term used hereinafter, is an assembly of a film transparency or film diapositive mounted in a stiffening and protective, substantially square frame having a centrally located window, in which the picture on the transparency may be viewed in through-passing light. The mounting frame, which is, of course, an important component of the slide unit, has a square size, commonly of internationally accepted standard, said size at least slightly exceeding the size of the film transparency itself. The method and the apparatus for mounting the film transparencies in the frames are valuable and necessary aids in the rational production of the slide units.

More specifically, this invention is concerned with slide units comprising a film transparency mounted in a frame of the kind composed of two substantially plate-like and rectangular frame halves each made in one piece of a moldable and malleable material such as thermoplastic and both being of substantially the same size and having a larger length than width, each of said frame halves having an opening therein that is displaced towards the one longitudinal edge thereof, and, along its opposite longitudinal edge, a thickened, strip-like marginal portion, the thickness of which is about twice the thickness of the remainder of the frame half, and the width of which corresponds approximately to half the difference between the square size of the slide unit and the extension of the transparency counted in the direction of width of the frame half, said marginal portion forming a shoulder stepped inwardly towards the opening on that side of each frame half which faces the other frame half, said two frame halves being held together in a face-to-face relationship in which they cover each other only partially, although their openings coincide, and in which the film transparency is received between their facing inner sides and between their inwardly facing shoulder steps so as to occupy a fixed position in a direction at right angle to said shoulders.

In a previously known type of such transparency slide units, the two frame halves were joined together by glueing or cementing, and there were no means, except for the glue or cement, to determine the proper mutual positions of the two frame halves and of the transparency between them in the direction parallel to the shoulders. This fact made the assembly of the slide unit objectionally inconvenient and slow and frequently harmful to the delicate transparency. Furthermore, although mechanical aids for mounting the transparencies in composite frames of the type in question were possibly expected to be developed at the time, more than ten years ago, when this kind of frame was first suggested, such aids have never become available. Instead, the whole idea was abandoned as worthless like many hundreds of other ideas and suggestions within the field of transparency slide units during the last four or five decades.

It is an object of the present invention to provide an improved transparency slide unit of the kind referred to hereinbefore, which is not only very satisfactory from a technical point of view but also extremely simple and cheap, in particular because its assembly is exceptionally convenient and speedy when accomplished more or less automatically in the apparatus or machine that forms part of this invention and is especially adapted for use in film developing laboratories and other institutions from where the completed slide units are to be delivered. It is a further object of the invention to teach how to produce the slide units and how to construct an effective, simple and reliable apparatus for the assembly of the final product.

The problems to be solved by the present invention are, in fact, of a complex nature, because they are intimately concerned not only with the mounting frame itself but with the entire assembly operation resulting in a permanent but intentionally easily breakable interconnection between the two frame halves forming part of the completed slide unit while assuring a perfect positioning of and no possible harm to the delicate and valuable transparency. All this is important, because many customers, although highly appreciating having their film transparencies mounted in frames when delivered from the film developing laboratory, prefer to remount at least some of them in more advanced and expensive, glazed frames later on. However, with this complexity in mind, the present invention suggests a transparency slide unit as well as an apparatus for producing the same, all as more closely defined in the accompanying claims.

It is an important advantage of this invention that the mounting frame for the film transparency combines the features of the previously known type of frame as referred to hereinbefore with simple additional means permitting not only an easy, rapid and permanent interconnection of the frame halves by rivetting and a safe and proper positioning of the transparency in all directions but also an extremely simple pre-assembly of the two frame halves into a preparatory frame unit that may be easily handled by mechanical aids but nevertheless widely opened without deformation of its parts, when the transparency is to be inserted therein, which makes it possible to use a fairly rigid plastic material in the frame and, hence, to produce a strong, durable and yet very thin slide unit.

Figure 2:
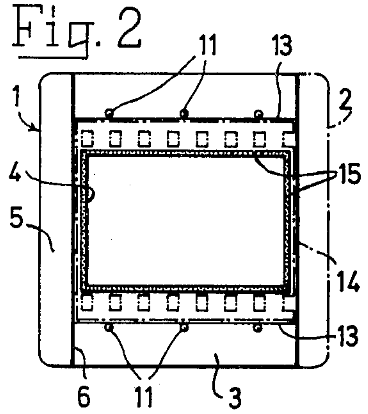
Figure 3:
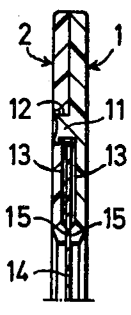
Figure 4:
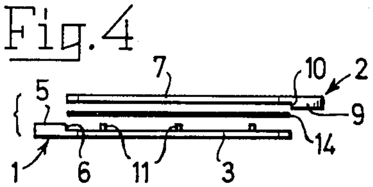
Figure 5:
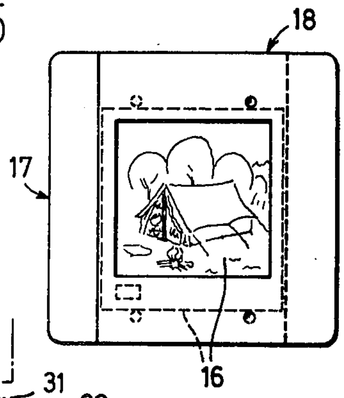
Figure 11:
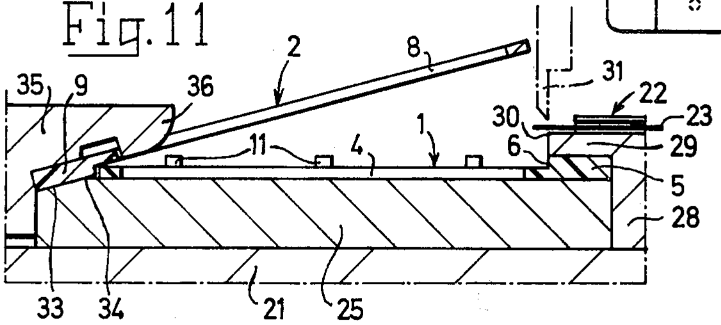
Figure 12:
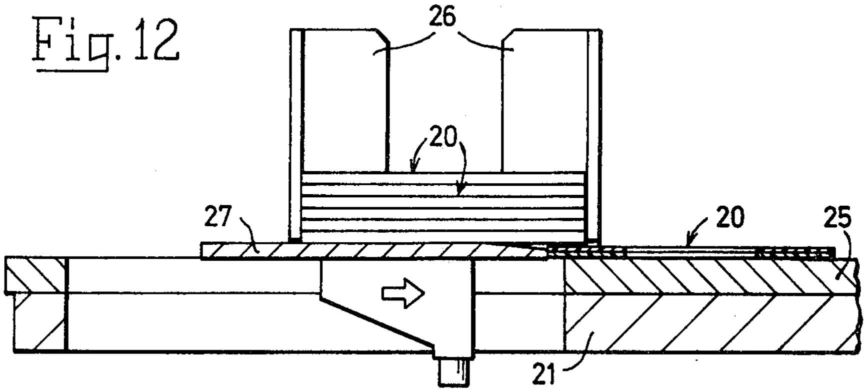
Figure 6:
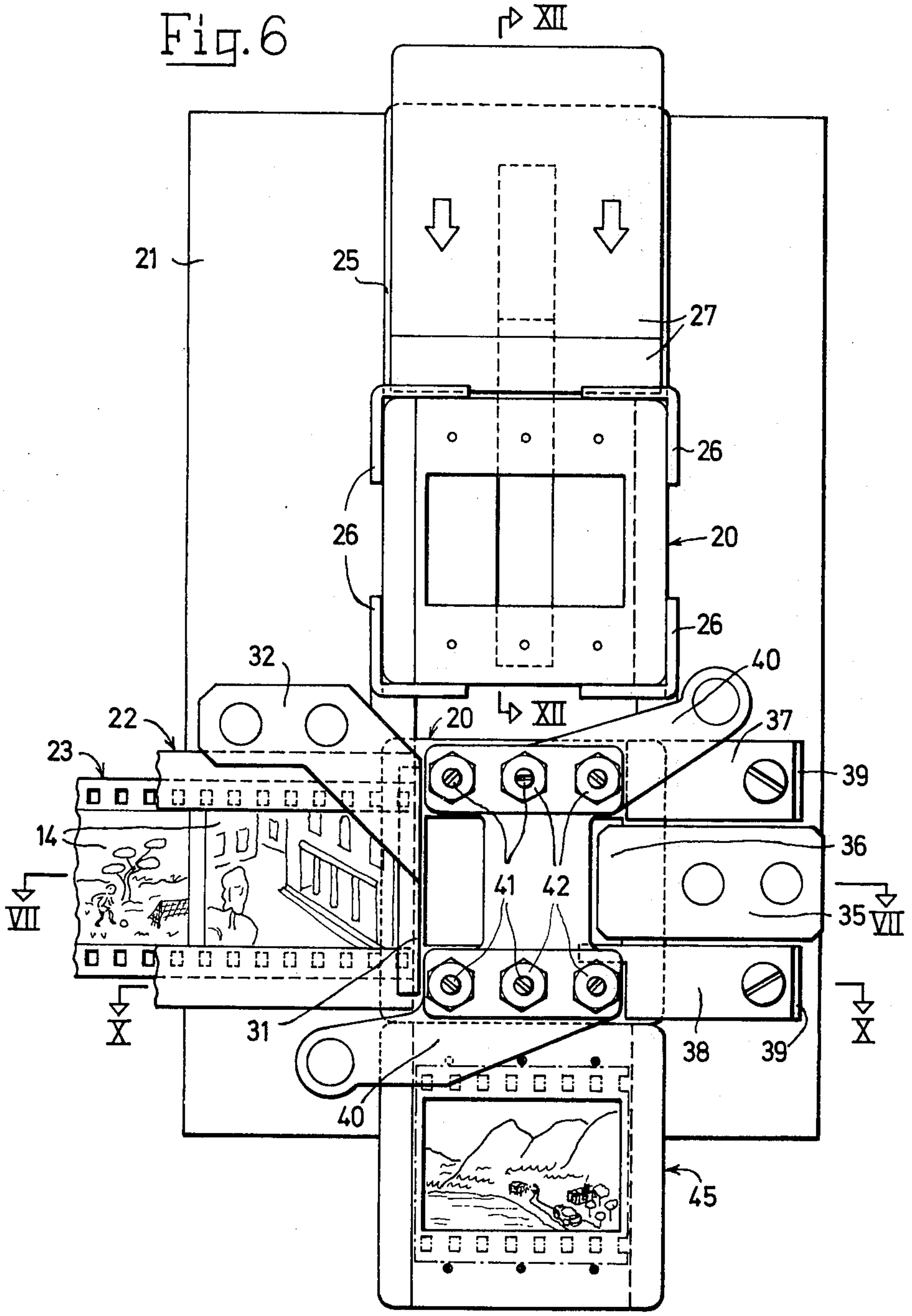
Figure 7:
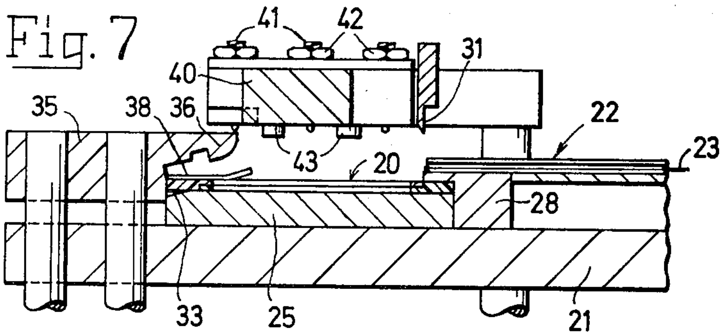
Figure 8:
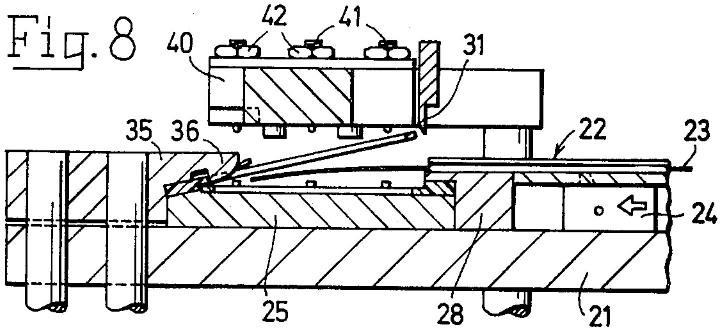
Figure 9:
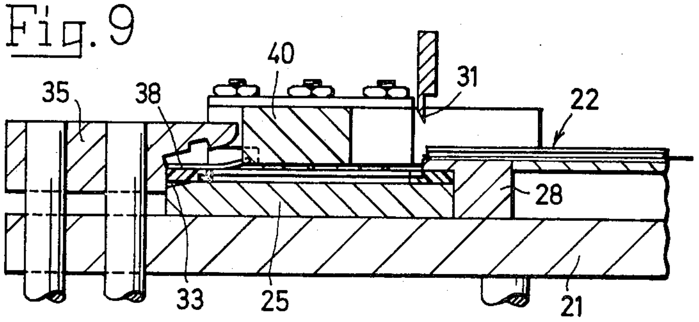
Figure 10:
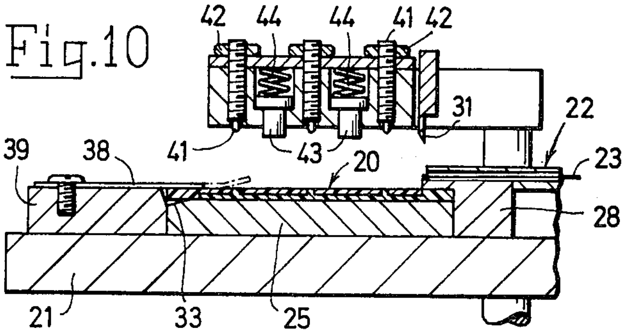

For further elucidation of the invention reference will now be had to the accompanying drawings in which FIG. 1 is a front view of a first form of transparency slide unit embodying the invention, FIG. 2 is a plan view of one of the two frame halves included in the unit illustrated in FIG. 1 and exposing its inner side, FIG. 3 is an enlarged section taken along the line III—III in FIG. 1, FIG. 4 is a so-called exploded view of the slide as seen from below in FIG. 1, FIG. 5 is a front view of a modified form of transparency slide unit embodying the invention, FIG. 6 is a plan view of an apparatus for mounting film transparencies in frames in order to produce transparency slide units of the kind illustrated in FIGS. 1–4, FIG. 7 is a sectional elevation taken along the line VII—VII in FIG. 6 and illustrating the positions of the various components during a first step in the cycle of operation of the apparatus, FIG. 8 is a sectional elevation similar to that of FIG. 7 but illustrating the position of the various components during a second step in the cycle of operation of the apparatus, FIG. 9 is a similar sectional elevation illustrating a third operational step of the apparatus, FIG. 10 is a sectional elevation taken along the line X—X in FIG. 6, FIG. 11 is an enlarged fragmentary sectional view substantially similar to that of FIG. 8 and illustrating in greater detail the course of operation of the apparatus when the transparency is to be inserted between the two frame halves, and FIG. 12 is a sectional elevation taken along the line XII—XII in FIG. 6 and illustrating the discharge of prepared frame units from a magazine of the apparatus, the means for treating the frame unit during the subsequent insertion of the transparency therein being excluded for the sake of simplicity.

The transparency slide unit illustrated in FIGS. 1–4 consists of two separately manufactured, substantially uniform, plate-like frame halves 1 and 2, which are both molded from a thermoplastic material. The frame half 1 comprises on the one hand a larger, rectangular and thinner portion 3 having a centrally located rectangular opening 4 therein, said opening extending in the direction of width of portion 3, and on the other hand a smaller, substantially strip-like and thicker marginal portion or shoulder 5 forming an extension of said thinner portion 3 along the one longitudinal edge thereof, said shoulder forming on the one, inner side of the frame half a straight abutment or step 6 turned towards the opening 4, the opposite, outer side of the frame half 1 being substantially planar. The other frame half 2 also comprises on the one hand a larger, rectangular and thinner portion 7, which is complementary in size and shape to the portion 3 of the frame half 1 and has an opening 8 therein corresponding to and coinciding with the opening 4, and on the other hand a smaller, substantially strip-like and thicker marginal portion or shoulder 9 forming an extension of the thinner portion 7 along the one longitudinal edge thereof, said shoulder forming on the inner side of the frame half 2 a straight abutment or step 10 turned towards the opening 8, the opposite, outer side of the frame half 2 being also substantially planar, i.e. the outer sides of the portions 7 and 9 are flush. The height of the step 6 formed by the shoulder 5 on the frame half 1 approximately equals the thickness of the thinner portion 7 of the second frame half 2 and similarly, the height of the step 10 of the frame half 2 approximately equals the thickness of the thinner portion 3 of the frame half 1.

On the inner side of the thinner portion 3 of the frame half 1 and integral therewith a number of peg-like projections 11 are formed, said projections having a height substantially equal to or only slightly larger than the height of the step 6, or the thickness of the thinner portion 7 of the frame half 2, respectively. The projections 11 are arranged in two parallel rows of three, one on either side of the opening 4 and each along one of those portions of the frame half 1 only which extend at right angle to the shoulder 5 on either side of the openin 4. The thinner portion 7 of the frame half 2 is in its turn provided with two rows of through-passing holes 12 corresponding to the projections 11 and having widened outer end portions open towards the outer side of the frame half. Furthermore, the thinner portions 3 and 7 of the two frame halves 1, 2 are slightly recessed between the two rows of projections 11 or holes 12, respectively, as is best seen from FIG. 3. The depth of the frame-like recess 13 thus obtained in each frame half slightly exceeds half the thickness of the transparency 14 to be received between the two frame halves in the completed slide unit. However, the recess 13 in each frame half is bordered in the direction towards the opening 4 or 8 therein by an elevated border area 15 having a rough surface in contact with the transparency 14, said border area having a height, which is so chosen that, when the two frame halves 1 and 2 are finally united, the transparency 14 between them will be firmly positioned and clamped around and close to its exposed picture only, while the remainder thereof is lying substantially free between the frame halves.

The transparency 14 incorporated in the slide unit is a piece of diapositive film cut off from a film strip of predetermined width and having a length only very slightly less than the width of the thinner portions 3,7 of the two frame halves 1,2. The size of the recesses 13 in the two frame halves is chosen to rather closely accomodate the transparency 14, and the free distance between the two rows of projections 11 only very slightly exceeds the width of the transpaency. When the transparency 14 is enclosed in the completed slide unit between the inner sides of the frame halves 1 and 2, i.e. between the thinner portions 3 and 7 of the latter, as indicated in FIG. 4, it will be effectively positioned on the one hand between the shoulder steps 6 and 10 and on the other hand between the two rows of projections 11. With the transparency 14 in place between the frame halves 1,2 the peg-like projections 11 entering through the holes 12 in the frame half 2 are rivetted in the widened outer portions of the holes 12 by means of suitable rivetting tools, which operation finishes the production of the slide unit. In the completed slide unit the thinner portions of the two frame halves overlap each other in face-to-face relationship with their openings coinciding while the thicker marginal portions or shoulders 5,9 form free extensions of the thinner portions 7,3 along opposite side edges of the unit. It follows from this that the length of each frame half 1 or 2 calculated in the direction of the shoulder 5 or 9 equals the square size of the completed slide unit while the width of each frame half calculated in the direction at right angle to the shoulder is less than the square size of the slide unit and, more exactly, just so much less as equals the width of the shoulder 5 or 9, said last-mentioned width being approximately equal to half the difference between the square size of the completed slide unit and the length of the transparency 14.

In FIGS. 1–4 the transparency 14 consists of a piece of film of the common picture size 24 × 36 millimeters having its picture centrally located in relation to the longitudinal edges of the film strip and the longitudinal direction of its rectangular picture paralleling the said edges. Cameras exist however, which, while using the same type of film, will deliver film pictures of other sizes, such as 24 × 24 millimeters or 24 × 18 millimeters. A slide unit comprising a transparency carrying a picture of such a size would differ from that shown in FIGS. 1–4 only in window-size and in that the shoulders of the frame halves would have a correspondingly larger width, in which case it might also be possible to reduce the number of peg-like projections and corresponding holes in each row. However, there are also cameras using film of other, unsymmetrical type and placing the pictures closer to one longitudinal edge of the film strip.

FIG. 5 shows an example of a slide unit containing a transparency cut from such a film strip. Also in this case the transparency 16 is mounted in a stiffening and protective frame of basically the same construction as described in connection with FIGS. 1–4 and consisting of two frame halves 17 and 18, respectively, with stepped thicker marginal portions or shoulders and thinner, mutually overlapping main portions, between which the transparency 16 is placed. Also in this case the distance between the opposed shoulder steps of the two frame halves is chosen according to the length of the transparency, and the distance between the two rows or groups of projections at the upper and lower edge of the transparency is adapted to the width of the transparency. However, the two groups of projections are located so as to compensate for the displaced position of the picture on the transpaency and to center it in the window of the completed slide unit. The slide unit shown in FIG. 5 also differs from the variant previously described in that each frame half is provided on the inner side of its thinner portion with two projections placed one above the other near the free edge of the thinner portion, and furthermore with two holes, one above the other, to receive the projections of the opposite frame half, said holes being placed closer to the shoulder of the frame half in question. Thus, the frame halves are in this case identical in shape. However, like in all slide units, it is advantageous to have the two frame halves of the present unit differently coloured or marked in order to indicate the actual position of the picture contained therein.

As already mentioned, the two frame halves are preferably molded from a thermoplastic material with properties suited for the purpose. This manufacture can be done in known machines, using precision-made molding tools in which the plastic mass is injected under high pressure. The separately produced frame halves are then put together in matching pairs with their inner sides in face-to-face relationship and with the projections of the one half freely entering the corresponding holes of the other half to form a kind of prepared frame unit, in which the two frame halves are not yet interlocked by rivetting but are nevertheless held in their final mutual positions in the plane of the frame unit through the co-operation of the projections and the holes and through the abutment of the respective shoulder steps with the free, thinner edges of the opposite frame half. These prepared frame units, which are ready to receive the transparencies, are delivered from the plastic manufacturer to the producer of the slide units in piles commonly containing a large number of frame units occupying predetermined, uniformly orientated positions in the piles. At the producer of the completed slide units the piled frame units are fed into a magazine in an apparatus, by means of which mounting of the transparencies in the frame units can be effected. A preferred form of such an apparatus is shown in FIGS. 6–12, this apparatus being adapted to produce slide units of the type shown in FIGS. 1–4.

The apparatus comprises primarily a bottom plate 21, under which there is a driving mechanism (not shown) serving to bring about the various movements of the various components of the apparatus. The details of this driving mechanism, which in addition to one or more driving motors may comprise e.g. levers actuated by cams, links actuated by cranks, screw-fed sliding means and other known mechanical movements and transmissions, are irrelevant for the invention and, therefore, not described. On the bottom plate 21, to the left in FIG. 6, there are means forming a feed track 22 for a film strip 23 containing a series of transparencies 14 at predetermined centre distances. The means forming the track 22 are so shaped that the film strip 23 is advanced at a certain level above the bottom plate 21 and is accurately guided in its longitudinal direction. The track 22 extends somewhat beyond the bottom plate 21 and comprises means, indicated at 24 in FIG. 8, for a stepwise advance of the film strip 23 past a cutting device, which will be described in the following.

On the bottom plate 21, at right angles to the track 22, there is also an elongate metal plate 25 forming a second track, along which the prepared frame units 20 referred to hereinbefore are fed, one by one, from a magazine formed by four angle rails 26 projecting upwardly from the plate 25. The piles of frame units 20 received from the plastic manufacturer are inserted into this magazine in such a way that each frame half 1 having the projections 11 will always be below its related frame half 2 and have its thicker edge portion or shoulder 5 turned towards that side of the apparatus, from which the film strip 23 is fed in along the track 22. The angle rails 26 constituting the magazine are so shaped at their lower ends that the lowermost frame unit 20 in the magazine can be discharged therefrom as illustrated in FIG. 12 by means of a reciprocating slide 27, while the remaining frame units are retained. The slide 27 has a predetermined stroke and such a shape that the discharged frame unit 20 is brought into a predetermined opening position on the track formed by the metal plate 25 right in front of the track 22 for the film strip 23.

Along the longitudinal side of the metal plate 25 facing the film track 22 is a guide rail 28 (FIGS. 7–11), the upper portion of which forms a flange 29, which covers and engages the upper side of the shoulder portion5 of the lowermost frame half 1 in the frame unit 20. Within the region of the width of the film track 22 this flange 29 forms a free edge 30, which is in line with the shoulder step 6 of the undermost frame half 1 and serves as a counter for a vertically movable knife 31, said knife forming in combination with the counter edge 30 the previously mentioned cutting device for the film strip. The knife 31 is carried by a support 32, which is in turn fastened to connecting rods passing through the bottom plate 21 for being actuated by the driving mechanism of the apparatus. The opposite, longitudinal marginal of the metal plate 25 is, along at least that part of its length which is occupied by the frame unit 20 discharged from the magazine into its opening position, provided with a recess 33 of wedge-shaped cross-section, the sloping bottom of which merges into the top face of plate 25 along a longitudinal line at 34, the distance of which from the counter edge 30 included in the cutting device slightly exceeds the length of the various transparencies of the film strip 23. In other words, the width of the recess 33 as seen in the direction of width of the metal plate 25 is less than the width of the shoulder portion 9 of the uppermost frame half 2 in the frame unit 20 discharged from the magazine (see particularly FIG. 11).

Right in front of the film track 22 but on the opposite side of the metal plate 25 is a vertically movable pressure shoe 35, which is also carried by connecting rods passing through the bottom plate 21 and connected below the latter to the driving mechanism of the apparatus. A portion of this pressure shoe 35 having an oblique lower side extends inwardly over the marginal portion of the metal plate 25 and is adapted, when the shoe is lowered, to engage with the upper side of the shoulder portion 9 of the uppermost frame half 2 of the frame unit received in its opening position and to press said shoulder portion down into the recess 33, whereby the frame half 2 will be swung open relative to the undermost frame half 1 about an axis represented by the line 34 (see particularly FIG. 11). When the frame half 2 is thus swung up, an extension 36 of the shoe 35 will enter the opening 8 therein and assist in guiding the free end of the film strip 23 in between the frame halves. The swinging-up of the uppermost frame half 2 about the axis 34 which is outside the step of the shoulder portion 9 will ensure a complete separation of the frame halves also within the region to the left in FIG. 11, which is highly desirable in order to prevent jamming of the free end of the film strip 23 during the entrance thereof into the opened frame unit.

When the frame unit has been opened as shown in FIGS. 8 and 11, the feeding in of the film strip 23 is accomplished, and, when this operation is finished the knife 31 is actuated in the downward direction to cut off the transparency to be mounted from the film strip. The transparency thus detached will, of course, be moved downwards by the knife so as to drop into its proper position on top of the frame half 1, and subsequently, when the knife has returned to its elevated initial position, the pressure shoe 35 is elevated leaving the uppermost frame half 2 free to swing back into the horizontal position. The lastmentioned movement is promoted by the provision of yieldable depressing means on either side of the pressure shoe 35, said means comprising leaf springs 37 and 38 attached to blocks 39 and extending inwardly over the frame unit resting on the metal plate 25 so as to resiliently counteract unintentional swinging-up of the uppermost frame half. The lowering of the uppermost frame half 2 into the correct closed position, in which the peg-like projections 11 on the frame half 1 enter the corresponding holes in the frame half 2, is also assisted by the engagement of the elevating pressure shoe 35 with the outer edge of the shoulder portion 9 of the frame half 2.

Arranged above that portion of the track formed by the metal plate 25, where the frame unit 20 is in its opening position, i.e. where the transparency is inserted into it as described above, is a vertically movable device comprising a body 40 which, like the knife support 32 and the pressure shoe 35, is carried by actuating rods passing through the bottom plate 21 and connected to the driving mechanism of the apparatus. The shape of the body 40 is chosen so as to permit at least a partial view from above into the area beneath it, where the framing operation takes place. The body 40 is provided with a number of rivetting tools 41, one for each projection 11 on the undermost frame half 1, and for an accurate vertical adjustment these tools take the form of screws with downwardly directed, pin-like points. After adjustment, the screws can be locked by nuts 42. Between the tools 41, the body 40 is provided with bores, in which plunger-like holding-down members 43 are movable against the action of springs 44 (FIG. 10). When the body 40 is lowered, these holding-down members 43 apply a pressure on the uppermost frame half 2 before the rivetting tools 41 enter into action, thereby ensuring that the frame halves are firmly pressed together around the transparency between them, when the rivetting of the projections 11 takes place according to FIG. 9. Of course, all projections 11 are rivetted at the same time, whereupon the slide unit is permanently closed and finished.

When the vertically movable device comprising the body 40 has been subsequently elevated enough to let the holding-down members 43 disengage the completed slide unit, the next cycle of operation of the apparatus begins as the sliding means 27 is brought to discharge another frame unit 20 from the magazine. At the same time the slide unit 45 just completed will be ejected from the apparatus, as shown at the bottom of FIG. 6.

In practice, the movements of the various components of the apparatus are timed in a manner well known per se so as to follow each other in a predetermined sequence, whereby the apparatus will operate reliably and speedy.

We claim as our invention:

1. An apparatus for making complete and permanently closed transparency slide units for use in projectors and viewers by mounting film transparencies severed in succession from film strips in individual, prepared and substantially square frame sets, each of which comprise a pair of separate but juxtaposed, substantially rectangular frame halves that each have an offset opening therein, a width that is equal to that of the completed unit and a length that is considerably smaller than that of the completed unit, which frame halves are adapted to receive and retain the transparency between them when they are in a position, one above the other, in which their openings coincide but the two frame halves themselves overlap each other only partly in their direction of length so as to present oppositely located free end marginal portions, the two frame halves of each prepared set being held in such partly overlapping position by means of rivetable studs protruding from the lower frame half and extending loosely through corresponding apertures in the upper frame half, said apparatus comprising:

a. a first guide track for a transparency film strip;

b. means for advancing the film strip stepwise along said first track;

c. a cutting device at the end of said first track and operative to sever from the passing film strip one transparency of a given length at the time;

d. a second guide track extending across the end of said first track for guiding prepared frame sets in side-by-side relationship from an inlet area of said second track into an opening position in front of the end of said first track and then further on to an outlet area of said second track, the first track connecting to one side of said second track;

e. means for supplying to the inlet area of said second track prepared frame sets of the type defined lying in a position in which each set has the free end marginal portion of its upper frame half remote from that side of said second track to which said first track connects;

f. means for advancing the frame sets thus supplied stepwise along said second track to place one by one of them in said opening position in front of the end of said first track;

g. said second track having along a portion of its length and at that longitudinal side thereof to which said first track connects, a cantilever-like flange extending inwardly over the track to entirely cover the free end marginal portion of the lower frame half of each frame set when the latter is received in said opening position, said flange having, at least within the length thereof covered by the width of the film strip, a top surface over which said film strip will pass when leaving the end of said first track, and a free edge forming a counter for a cutting tool included in said cutting device;

h. said second track having further, within an area opposite to but remote from said free counterforming edge, a bottom recess, said recess having a length corresponding at least to the width of the frame set when the latter is received in said opening position, and a width measured across said second track that is at least slightly less than the difference in length between the upper frame half and the entire frame set;

i. a vertically movable pressure shoe above said recess and operative to temporarily force the free end marginal portion of the upper frame half of each frame set received in said opening position downwrdly and partly into said recess to thereby temporarily separate the two frame halves by canting and lifting the upper one while leaving the lower one substantially intact; and j. also above said second track and separate from said shoe, a vertically movable device including means serving as tools for permanently uniting the two frame halves of each frame set together by riveting the studs of the lower frame half when the related transparency has been inserted between the two separated frame halves, severed from the film strip and properly retained by again closing together the two frame halves.

2. An apparatus according to claim 1 wherein said vertically movable device further includes resilient holdingdown means for pressing the frame halves together before said rivetting tools enter into operation at the forced lowering of the device.

3. An apparatus according to claim 1 wherein said vertically movable device is located above that portion of said second track within which the frame unit occupies its opening position, and has such configuration as to permit at least a partial view from above into said portion of the track and, hence, a supervision of the course of the framing operation.

4. An apparatus according to claim 1 wherein said bottom recess in said second track has a substantially wedge-shaped cross section and decreases in depth towards said counterforming edge.

5. An apparatus for making complete and permanently closed transparency slide units for use in projectors and viewers by mounting film transparencies severed in succession from film strips in individual, prepared and substantially square frame sets, each of which comprises a pair of separate but juxtaposed, substantially rectangular frame halves that each have an offset opening therein, a width that is equal to that of the completed unit and a length that is considerably smaller than that of the completed unit, which frame halves are adapted to receive and retain the transparency between them when they are in a position, one above the other, in which their openings coincide but the two frame halves themselves overlap each other only partly in their direction of length so as to present oppositely located free end marginal portions, the two frame halves of each prepared set being held in such partly overlapping position by means of rivetable studs protruding from the lower frame half and extending loosely through corresponding apertures in the upper frame half, said apparatus comprising:

a. a first guide track for a transparency film strip;

b. means for advancing the film strip stepwise along said first track;

c. a cutting device at the end of said first track and operative to sever from the passing film strip one transparency of a given length at the time;

d. a second guide track extending across the end of said first track for guiding prepared frame sets in side-by-side relationship from an inlet area of said second track into an opening position in front of the end of said first track and then further on to an outlet area of said second track, the first track connecting to one side of said second track;

e. means for supplying to the inlet area of said second track prepared frame sets of the type defined lying in a position in which each set has the free end marginal portion of its upper frame half remote from that side of said second track to which said first track connects;

f. means for advancing the frame sets thus supplied stepwise along said second track to place one by one of them in said opening position in front of the end of said first track;

g. said second track having along a portion of its length and at that longitudinal side thereof to which said first track connects, a cantilever-like flange extending inwardly over the track to entirely cover the free end marginal portion of the lower frame half of each frame set when the latter is received in said opening position, said flange having, at least within the length thereof covered by the width of the film strip, a top surface over which said film strip will pass when leaving the end of said first track, and a free edge forming a counter for a cutting tool included in said cutting device;

h. said second track having further, within an area opposite to but remote from said free counterforming edge, a bottom recess, said recess having a length corresponding at least to the width of the frame set when the latter is received in said opening position, and a width measured across said second track that is at most equal to the difference in length between the upper frame half and the entire frame set;

i. a vertically movable pressure shoe above said recess and operative to temporarily force the free end marginal portion of the upper frame half of each frame set received in said opening position downwardly and partly into said recess to thereby temporarily separate the two frame halves by canting and lifting the upper one while leaving the lower one substantially intact, said pressure shoe having means thereon entering through the opening of the upper frame half of the opened frame unit for guiding the free end of the film strip when the latter is fed in between the two frame halves, and j. also above said second track and separate from said shoe, a vertically movable device including means serving as tools for permanently uniting the two frame halves of each frame set together by riveting the studs of the lower frame half when the related transparency has been inserted between the two separated frame halves, severed from the film strip and properly retained by again closing together the two frame halves.

6. An apparatus for making complete and permanently closed transparency slide units for use in projectors and viewers by mounting film transparencies severed in succession from film strips in individual, prepared and substantially square frame sets, each of which comprises a pair of separate but juxtaposed, substantially rectangular frame halves that each have an offset opening therein, a width that is equal to that of the completed unit and a length that is considerably smaller than that of the completed unit, which frame halves are adapted to receive and retain the transparency between them when they are in a position, one above the other, in which their openings coincide but the two frame halves themselves overlap each other only partly in their direction of length so as to present oppositely located free end marginal portions, the two frame halves of each prepared set being held in such partly overlapping position by means of rivetable studs protruding from the lower frame half and extending loosely through corresponding apertures in the upper frame half, said apparatus comprising:

a. a first guide track for a transparency film strip;

b. means for advancing the film strip stepwise along said first track;

c. a cutting device at the end of said first track and operative to sever from the passing film strip one transparency of a given length at the time;

d. a second guide track extending across the end of said first track for guiding prepared frame sets in side-by-side relationship from an inlet area of said second track into an opening position in front of the end of said first track and then further on to an outlet area of said second track, the first track connecting to one side of said second track;

e. means for supplying to the inlet area of said second track prepared frame sets of the type defined lying in a position in which each set has the free end marginal portion of its upper frame half remote from that side of said second track to which said first track connects;

f. means for advancing the frame sets thus supplied stepwise along said second track to place one by one of them in said opening position in front of the end of said first track;

g. said second track having along a portion of its length and at that longitudinal side thereof to which said first track connects, a cantilever-like flange extending inwardly over the track to entirely cover the free end marginal portion of the lower frame half of each frame set when the latter is received in said opening position, said flange having, at least within the length thereof covered by the width of the film strip, a top surface over which said film strip will pass when leaving the end of said first track, and a free edge forming a counter for a cutting tool included in said cutting device;

h. said second track having further, within an area opposite to but remote from said free counterforming edge, a bottom recess, said recess having a length corresponding at least to the width of the frame set when the latter is received in said opening position, and a width measured across said second track that is at most equal to the difference in length between the upper frame half and the entire frame set;

i. a vertically movable pressure shoe above said recess and operative to temporarily force the free end marginal portion of the upper frame half of each frame set received in said opening position downwardly and partly into said recess to thereby temporarily separate the two frame halves by canting and lifting the upper one while leaving the lower one substantially intact;

j. also above said second track and separate from said shoe, a vertically movable device including means serving as tools for permanently uniting the two frame halves of each frame set together by riveting the studs of the lower frame half when the related transparency has been inserted between the two separated frame halves, severed from the film strip and properly retained by again closing together the two frame halves; and k. resiliently yieldable depressing means provided over said second track to counteract unintentional swinging-up of the upper frame half of the frame unit.

* * * * *